United States Patent
Arnold

(10) Patent No.: US 12,372,163 B2
(45) Date of Patent: Jul. 29, 2025

(54) PROCESS COMPONENT

(71) Applicant: GEA Tuchenhagen GmbH, Büchen (DE)

(72) Inventor: Wolfgang Arnold, Großerlach (DE)

(73) Assignee: GEA Tuchenhagen GmbH, Büchen (DE)

(*) Notice: Subject to any disclaimer, the term of this patent is extended or adjusted under 35 U.S.C. 154(b) by 87 days.

(21) Appl. No.: 18/553,329

(22) PCT Filed: Mar. 29, 2022

(86) PCT No.: PCT/EP2022/058260
§ 371 (c)(1),
(2) Date: Sep. 29, 2023

(87) PCT Pub. No.: WO2022/207637
PCT Pub. Date: Oct. 6, 2022

(65) Prior Publication Data
US 2024/0183461 A1 Jun. 6, 2024

(30) Foreign Application Priority Data
Mar. 31, 2021 (DE) ...................... 10 2021 001 687.4

(51) Int. Cl.
*F16K 31/08* (2006.01)
*F16K 31/06* (2006.01)

(52) U.S. Cl.
CPC ........ *F16K 31/088* (2013.01); *F16K 31/0675* (2013.01); *F16K 31/082* (2013.01)

(58) Field of Classification Search
USPC ......... 251/65, 251, 252, 264, 267, 268, 273; 310/12.24–12.26
See application file for complete search history.

(56) References Cited

U.S. PATENT DOCUMENTS

| | | |
|---|---|---|
| 2,289,574 A | 7/1942 | Carlson |
| 2,792,194 A | 5/1957 | Huck |
| 4,671,486 A * | 6/1987 | Giannini ............... F16K 31/088 251/267 |

(Continued)

FOREIGN PATENT DOCUMENTS

| | | |
|---|---|---|
| CN | 204704396 U | 10/2015 |
| DE | 102004012245 A1 | 9/2005 |

(Continued)

*Primary Examiner* — Matthew W Jellett
(74) *Attorney, Agent, or Firm* — Young Basile Hanlon & MacFarlane, P.C.

(57) ABSTRACT

A process component having a longitudinal axis is provided. The process component includes a housing that surrounds an interior space and includes a first connector and a second connector, a tappet located in the interior space, a first magnet arrangement located on the tappet, and a second magnet arrangement that is magnetically coupled to the first magnet arrangement and is rotatable on the housing about the longitudinal axis. In order to create a process component that is easily scalable in size and can be easily cleaned, the tappet cooperates with a guide provided in the interior space, displacing the first magnet arrangement towards the second magnet arrangement to convert a rotary movement of the second magnet arrangement into an axial movement of the tappet.

18 Claims, 4 Drawing Sheets

(56) References Cited

U.S. PATENT DOCUMENTS

| | | | | |
|---|---|---|---|---|
| 4,948,091 | A * | 8/1990 | Satoh | F16K 31/082 |
| | | | | 251/129.21 |
| 5,611,368 | A * | 3/1997 | Hwang | H02K 49/108 |
| | | | | 137/553 |
| 6,084,326 | A * | 7/2000 | Nagai | H02K 7/06 |
| | | | | 74/424.89 |
| 7,487,829 | B2 * | 2/2009 | McDonald | E21B 34/06 |
| | | | | 166/66.5 |
| 9,377,121 | B2 * | 6/2016 | Burgess | F16K 31/54 |
| 9,466,695 | B2 * | 10/2016 | Taraud | G21D 1/00 |
| 9,797,521 | B1 * | 10/2017 | Davis | F16K 1/221 |
| 10,221,959 | B1 * | 3/2019 | Davis | F16K 31/504 |
| 10,359,125 | B2 * | 7/2019 | Hübner | B67C 11/04 |
| 11,242,936 | B2 * | 2/2022 | Maerz | F16K 15/048 |
| 2003/0181788 | A1 | 9/2003 | Yokoi et al. | |

FOREIGN PATENT DOCUMENTS

| | | |
|---|---|---|
| EP | 3497354 A1 | 6/2019 |
| JP | S52-041921 A | 3/1977 |
| WO | 2018/031475 A1 | 2/2018 |

* cited by examiner

PROCESS COMPONENT

TECHNICAL FIELD

The invention relates to a process component having a longitudinal axis.

BACKGROUND

Process components, in which a tappet is moved with magnetic forces in an interior space of the process component, are known in the prior art. To this end, a first magnet arrangement is provided on the tappet, which is magnetically coupled to a second magnet arrangement. The second magnet arrangement is situated on the housing and is movable.

Such a process component is disclosed in CN 204704396 U. Therein, the second magnet arrangement is rotated about a longitudinal axis of the process component. As a result, the first magnet arrangement coupled to it likewise rotates in an interior space of the process component. A tappet is movably located on a thread, by means of which the rotary movement is converted into an axial movement along the longitudinal axis.

Process components are utilized in systems for the production of foods, beverages, medicines, and fine chemical products as well as in biotechnology. Pipeline diameters of ten centimeters and more are used in these fields. At the same time, high hygienic and, in some places, aseptic properties of the process component are required, for example tightness and cleanability.

SUMMARY

Therefore, an object of the invention is to create a process component that can be very easily cleaned and is easily scalable in size.

This object is achieved by a process component according to embodiments described herein.

A process component has a longitudinal axis and includes a housing that surrounds an interior space and comprises a first connector and a second connector, a tappet located in the interior space, a first magnet arrangement located on the tappet, and a second magnet arrangement that is magnetically coupled to the first magnet arrangement and is rotatable on the housing about the longitudinal axis. The tappet cooperates with a guide provided in the interior space, displacing the first magnet arrangement towards the second magnet arrangement to convert a rotary movement of the second magnet arrangement into an axial movement of the tappet. The first magnet arrangement can be part of the tappet or connected, preferably rigidly connected, thereto.

With this design, the rigid coupling of the first and the second magnet arrangement, as demonstrated in the prior art, is replaced by a flexible coupling. It is true that the magnet arrangements are coupled to one another at all times. However, different portions of individual magnets or even multiple different magnets are utilized, via which the coupling is passed on as in the case of a relay. Permanent magnets, for example in the form of bars, cylinders, or spheres, can be used in the magnet arrangements. The magnetization of the permanent magnets are aligned for a coupling of the magnet arrangements that is as strong as possible.

This makes it possible to scale the process component to dimensions such as those that are necessary in the applications mentioned at the outset, for example in the decimeter range. In addition, the scalability facilitates a hygienic and aseptic design because it provides radii in the range of several millimeters, for example, in accordance with the prevailing standards, and screw threads can be dispensed within the product area.

The process component can be advantageously embodied as a valve because the advantages of the aforementioned design particularly come into their own there. In this embodiment, it is provided that a fluid connection exists between the first connector and the second connector, and, thanks to a suitable design, the tappet is suitable for interrupting said fluid connection. The necessary forces acting on the tappet can be generated inexpensively and, at the same time, no mechanical coupling of the tappet to an adjusting device located outside of the housing is necessary due to the magnetic coupling. Accordingly, it is possible to dispense with sealing of the mechanical connection between the tappet and the adjusting device. Consequently, a hygienic weak point is eliminated. This advantage is equally achieved in a switching valve that is switched between open and closed and in a control valve in which the tappet comprises, for example, a control cone contour cooperating with an associated seat in order to gradually adjust the flow through the control valve.

A further advantage is that radial, axial, and semi-axial sealing arrangements can be utilized in the process component between the tappet and the housing.

In an embodiment that is inexpensive because it is structurally simple and is very well suited to hygienic applications, the guide includes two domes in the form of spherical sectors. The domes act as elevations on an inner wall of the housing, between which a portion of the first magnet arrangement is situated. The degrees of freedom of movement thereof are restricted to the desired extent.

The first magnet arrangement can include a spiral. This allows the speed of movement of the tappet to be fixed at a value that is favorable for the application by means of the pitch of the magnet arrangement. In addition, the necessary strength of the magnetic coupling between the first and the second magnet arrangement can be designed. For example, the utilization of magnetic material can be kept to a minimum if a pitch of the spiral is chosen to be flat.

The spiral can be embodied with a hollow rod, in which permanent magnets are received, for example spherical magnets. This reduces the production costs, for example by facilitating assembly.

The magnetic coupling of the magnet arrangements is improved if, according to an embodiment, the second magnet arrangement extends in the direction of a longitudinal axis over a height of a spiral winding of the spiral.

Another embodiment improves the resistance of the first magnet arrangement and the tappet to tilting out of the longitudinal axis in that the second magnet arrangement extends in the direction of a longitudinal axis over a height of a spiral winding of the spiral.

In turn, another embodiment aims to improve the magnetic coupling between the magnet arrangements. The first magnet arrangement includes at least two spherical magnets, between which a non-magnetic steel sphere is located, and the magnetization thereof is aligned with a radial direction. This leads to a close coupling of the spherical magnets to the second magnet arrangement. The latter can include multiple magnets, wherein each of these magnets, when viewed radially, can be located in line with a spherical magnet.

According to another solution, which brings about an improvement of the magnetic coupling between the magnet arrangements, the first magnet arrangement includes at least two permanent magnets, the magnetization of which is aligned in opposite directions to one another and with a radial direction, and which are connected to one another with a field conductor. This creates a horseshoe-shaped magnet arrangement that couples to the second magnet arrangement. A closed magnetic circuit can be formed, as a result of which the coupling becomes stronger.

Modifications to the second magnet arrangement are also suitable for improving the magnetic couplings between the magnet arrangements. A positive effect was thus achieved in that the second magnet arrangement includes at least two magnets that are aligned magnetically in opposite directions to one another so that the magnetic north pole and the magnetic south pole are approximately opposite one another.

The movement of the second magnet arrangement on an orbit about the longitudinal axis, also referred to as rotation below, which is necessary for the movement of the tappet, is brought about by a magnet adjustment means that can be designed to be manually operated, hydraulic, pneumatic, or driven by an electric motor. In an advantageous embodiment, the movement is generated in that the magnet adjustment means includes an electrical coil, the magnetic field of which can be brought into operative connection with the magnetic field of the second magnet arrangement. By altering the energization of the coil, this alters the influence thereof on the second magnet arrangement, to which the latter reacts with a mechanical movement. The selection of the number of electrical coils, the distribution thereof along the orbit and the extension over the circumference of the housing of the process component make it possible to match the triggered movement of the second magnet arrangement precisely to the needs arising from the field of application of the process component.

BRIEF DESCRIPTION OF THE DRAWINGS

The invention shall be explained with reference to an exemplary embodiment and its advantages expanded upon.

DETAILED DESCRIPTION

Figure 1:
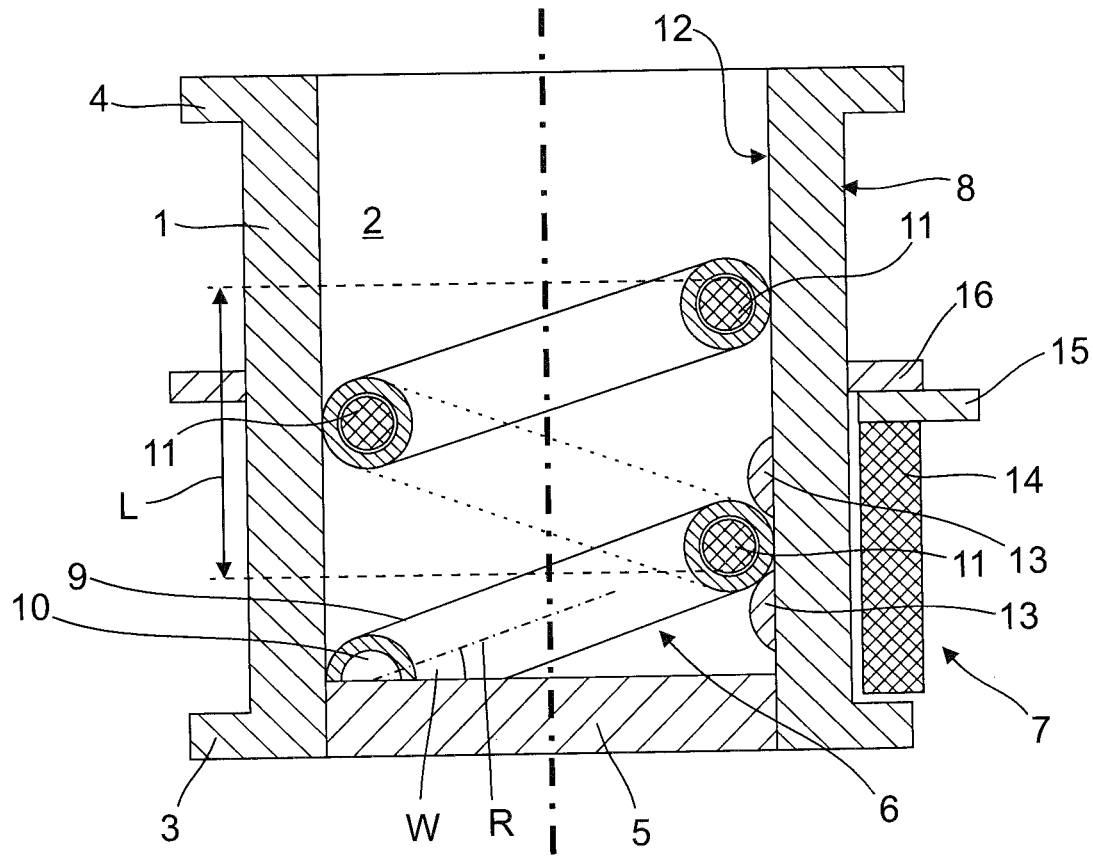
FIG. 1 shows a section through a process component in a first position of the tappet.
Figure 2:
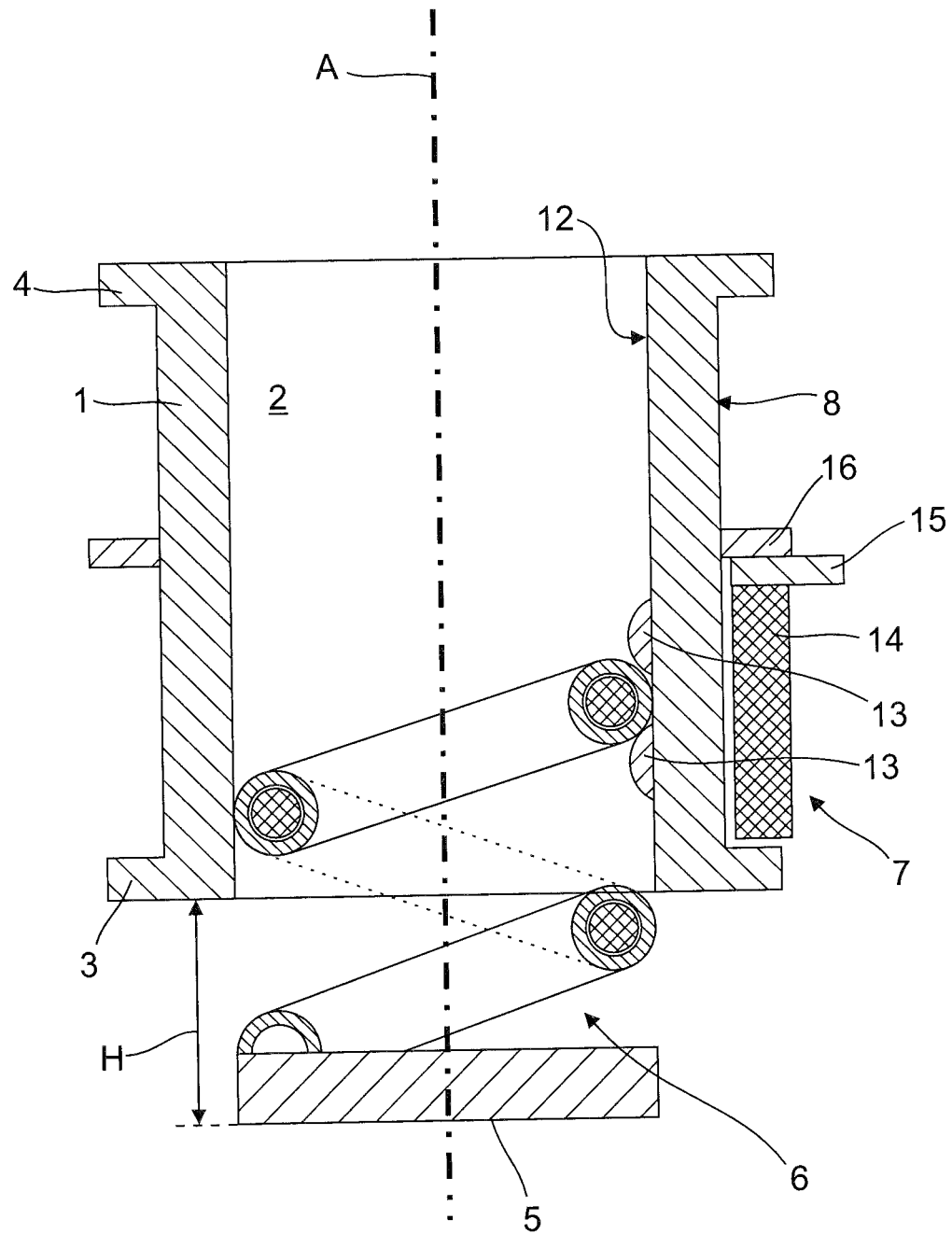
FIG. 2 shows a section through the process component in a second position of the tappet.

A process component is shown in a section along a longitudinal axis A through the housing 1 in FIG. 1 and FIG. 2.

The housing 1 comprises an interior space 2. The interior space 2 is accessible to fluid via a first connector 3. At an opposite end of the housing 1 along the longitudinal axis A, a second connector 4 is provided, through which fluid can enter the interior space 2. The process component allows the passage of fluid along the first connector 3 and the second connector 4. One or both of the first connector 3 and the second connector 4 can be located at an angle to the longitudinal axis A. The connectors do not have to be located directly opposite although this is advantageous for the fluid flow.

A tappet 5 is provided in the interior space 2. In the example shown here of a process component embodied as a valve, the tappet 5 is designed in a suitable manner to interrupt the fluid connection between the first connector 3 and the second connector 4. The interrupted fluid connection, also referred to as the closing position of the valve, is shown in FIG. 1. In contrast, in FIG. 2, the tappet 5 is situated in a position that allows a fluid flow between the first connector 3 and the second connector 4.

In order to generate the closing position, the housing 1 and the tappet 5 are embodied for sealing cooperation, for example in that the tappet 5 can be brought into sealing contact with a portion of the housing 1. Said sealing contact can be supported with seals known in the area of application. For example, a sealing ring is then provided on the tappet 5. The arrangement with the seal can be embodied to be radial, axial, or semi-axial.

Further applications of the process component are conceivable. For example, the tappet 5 can carry a spray nozzle that is moved from the interior space into a tank, on which the process component is mounted. A cleaning liquid can be introduced into the tank through such a spray nozzle.

A first magnet arrangement 6 is located on the tappet 5. The first magnet arrangement 6 extends in the direction of the longitudinal axis A over a length L that is sufficient for the desired stroke H of the tappet 5. "Sufficient" means that, in any position of the tappet 5 along its stroke H, there is a magnetic coupling with a second magnet arrangement 7, which magnetic coupling has enough force to withstand fluid pressure. The second magnet arrangement 7 is on an outer side 8 of the housing 1.

Figure 3:
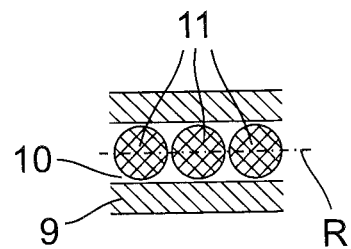
FIG. 3 shows a section through a first magnet arrangement that is located on the tappet.

The first magnet arrangement 6 has, in the presented example, at least in sections, the form of a spiral 9 that extends from the tappet 5 into the interior space 2 along the longitudinal axis A. A long magnet can be located along the spiral 9. The first magnet arrangement 6 advantageously has a plurality of permanent magnets that are situated in a hollow space of the spiral 9, which is embodied as a tube. The tube is preferably manufactured from a non-magnetic stainless steel. the tube preferably has a round cross-section because this is more hygienic. The permanent magnets can be embodied as spherical magnets 11, which simplifies the manufacture of the spiral tube filled with magnets. This latter embodiment is illustrated in FIG. 3 with a section along an axis R of the tube. An angle W between the axis of the tube R and a plane to which the longitudinal axis A is perpendicular defines a pitch of the spiral 9.

The housing 1 has an inside 12 facing the interior space 2. At least one guide 13, in which the first magnet arrangement 6 is guided, is located on the inside 12. The guide 13 can include two domes in the form of spherical sectors, between which the spiral 9 runs in a slidingly displaceable manner. The guide 13 is configured such that the displacement can only be affected at an angle to the longitudinal axis A. The advantages of the indicated domes include that they are easy to clean and have a small contact surface for deposits. The spiral 9 and the housing 1 are dimensioned so that the spiral 9 is braced on the inside 12 against tilting about the longitudinal axis A.

The second magnet arrangement 7 on the outside 8 of the housing 2 includes at least one magnet 14. The second magnet arrangement 7 extends over a part of a circumference about the longitudinal axis A. The magnet 14 is carried by a magnet holder 15. The latter is rotatably supported by a magnet adjustment means 16. The magnet adjustment means 16 is adapted for a rotation of the magnet 14 about the housing 1 and the longitudinal axis A. Said rotation is brought about by a drive (not shown) that can be manually operated, hydraulic, pneumatic, or driven by an electric motor. In order to obtain a good magnetic coupling of the first magnet arrangement 6 and the second magnet arrangement 7, the second magnet arrangement 7, the magnet 14 in the example shown, preferably extends in the direction of the longitudinal axis A over a height of a spiral winding of the spiral 9.

The switching process of the process component of this example, which is embodied as a valve, can be seen by comparing FIG. 1 with FIG. 2. The tappet 5 is brought from the closing position according to FIG. 1 into the open position according to FIG. 2 in that the magnet 14 rotates once about the longitudinal axis A. Thanks to the magnetic coupling with the spherical magnet 11 firmly located in the hollow space 10, the spherical magnet 11 initially follows the magnet 14. Thanks to the spiral form of the first magnet arrangement 6 in cooperation with the guide 13, a displacement of the spherical magnet 11 is affected relative to the magnet 14 along the longitudinal axis A. At the same time, the spiral 9 and, therefore, the first magnet arrangement 6 likewise rotate about the longitudinal axis A. In the further course of the path movement of the magnet 14 on its revolution about the longitudinal axis A, the spiral 9 is rotated like a screw. The magnetic coupling to the magnet 14 jumps from a spherical magnet 11 to its adjacent spherical magnet 11. A revolution of the magnet 14 ensures that the spiral revolves. The spiral 9 executes said screw movement thanks to the guide 13 and is displaced about the pitch of the length L of the spiral 9. Said displacement means that the tappet 5 is moved by the stroke H.

The closing movement that brings the tappet 5 from the position according to FIG. 2 into the position according to FIG. 1 is brought about by a circling about the longitudinal axis A in the opposite direction to the described circling of the magnet 14. The drive and the magnet adjustment means 16 are accordingly configured for executing said movement.

A tilting of the spiral 9 towards the longitudinal axis A can be prevented in that more than the length L of the first magnet arrangement 6 remains in operative contact with the inside 12. That is more than the spiral pitch in the example of the spiral 9.

Figure 4:
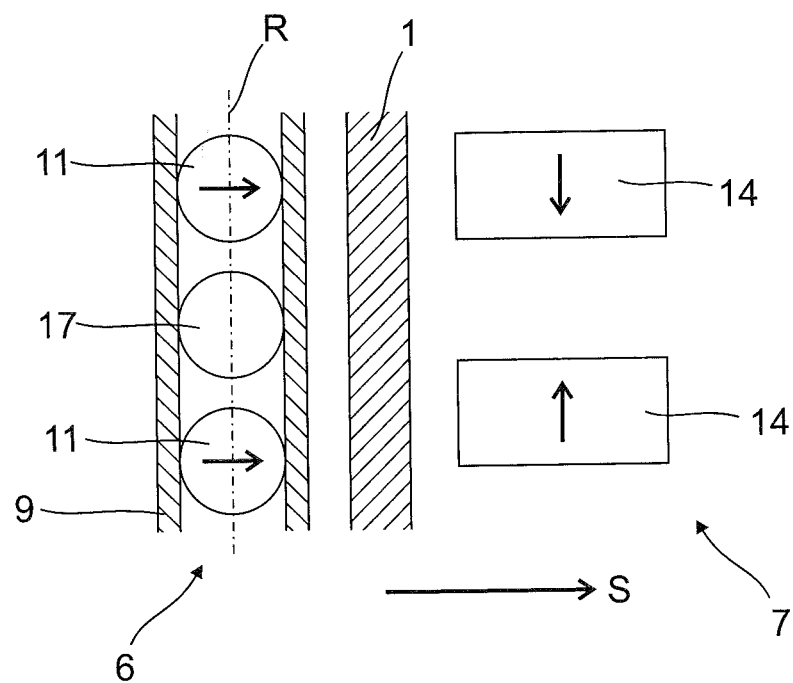
FIG. 4 shows a schematic representation of the magnet arrangements and the magnetization thereof.

FIG. 4 shows a part of the first magnet arrangement 6 and the second magnet arrangement 7 in a schematic representation.

The first magnet arrangement 6 and the second magnet arrangement 7 are spatially separated from one another by the housing 1. However, they are in operative connection with one another via magnetic forces. The alignment of the magnetization of the permanent magnets of the first magnet arrangement 6 and the second magnet arrangement 7 is illustrated by arrows. In order to transmit forces, the magnetic fields of the permanent magnets of both the first magnet arrangement 6 and the second magnet arrangement 7 have to interact with one another. It becomes apparent that a particularly good force transmission via the fields is achieved when the magnetization of the spherical magnets 11 of the first magnet arrangement 6 is aligned along a radial direction S perpendicular to the longitudinal axis A. Meanwhile, the magnetization of the magnets 14 of the second magnet arrangement 7 is aligned with a direction perpendicular to the radial direction S. Magnets 14 that are adjacent in each case in a circumferential direction about the longitudinal axis L are aligned magnetically in opposite directions to one another in such a way that the magnetic north pole and the magnetic south pole are approximately opposite. Spherical magnets 11 and magnets 14 can be magnetized perpendicularly to one another. Furthermore, an improvement of the magnetic coupling has been demonstrated by locating a magnetically neutral spacer element, for example a non-magnetic steel sphere 17, in each case between two adjacent spherical magnets 11. The extension of the one-part or multipart spacer element along the axis R is dimensioned such that spherical magnets 11 are associated in pairs with the first magnet arrangement 6 and magnets 14 are associated in pairs with the second magnet arrangement 7, for example are opposite one another and can be located in line in the radial direction S. This brings about a particularly good magnetic coupling.

Figure 5:
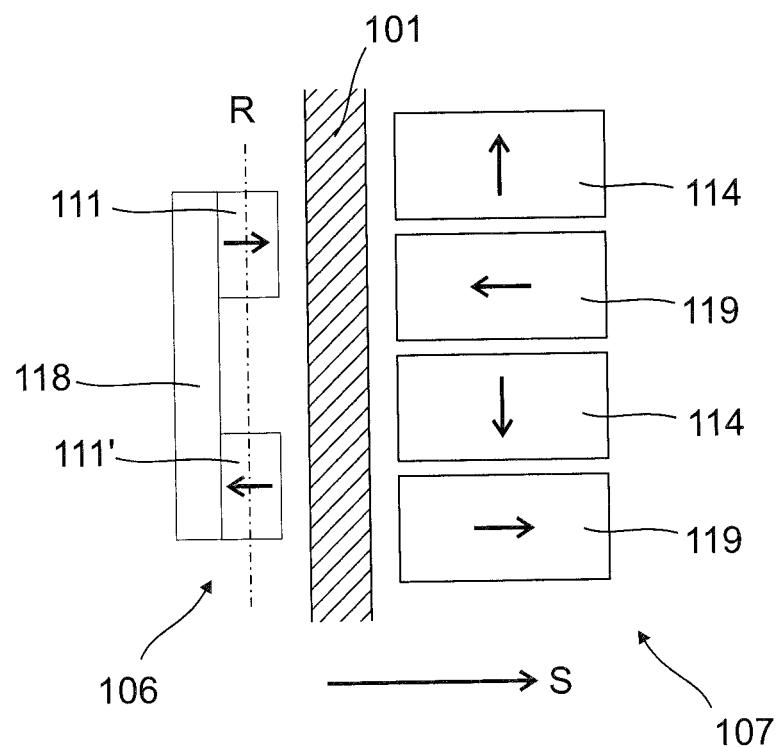
FIG. 5 shows a schematic representation of the magnet arrangements and the magnetization thereof in a first further development.

A further development of the first magnet arrangement 6 and the second magnet arrangement 7 is schematically depicted in FIG. 5, in which arrows likewise symbolize the alignment of the magnets.

The coupling between the first magnet arrangement 106 and the second magnet arrangement 107 is improved in that the magnetization direction is selected as depicted.

The first magnet arrangement 106 has at least two permanent magnets 111, the magnetization of which is aligned with the radial direction S, however in opposite directions. Whereas, in the case of a permanent magnet 111, the magnetic south pole lies radially on the inside and the magnetic north pole lies radially on the outside, the exact opposite is true in the case of the adjacent permanent magnet 111'. On the side radially on the inside of the permanent magnets 111 and 111' and, therefore, facing away from the housing 101, two adjacent permanent magnets 111 and 111' are connected to one another with a magnetically conducting field conductor 118.

In addition to the magnetized magnets 114 described above in the case of FIG. 4, the second magnet arrangement 107 also comprises guide magnets 119. In each case, one guide magnet 119 is located between two magnets 114. Whilst the magnetization of the magnets 114 is inclined towards the radial direction S, for example approximately at right angles thereto as described above, the magnetization of the guide magnets 119 is aligned with the radial direction S. As depicted in FIG. 5, the magnetization of four adjacent magnets 114 and guide magnets 119 can be rotated about a right angle so that the fifth following magnet or guide magnet again has the magnetization direction of the first. In the example, the magnetization rotates clockwise about an axis perpendicular to the paper plane and counterclockwise when the sequence of magnets 114 and guide magnets 119 is viewed from top to bottom in FIG. 5.

In this embodiment as well, this leads to an improved magnetic coupling between the first magnet arrangement 6 and the second magnet arrangement 7, if a permanent magnet 111, 111' of the first magnet arrangement 106 and a magnet 114 of the second magnet arrangement 107 can in each case be brought into line along the radial direction S, thus opposite one another.

The distance between adjacent permanent magnets 111, 111' and the extension of the field conductor along the direction R are selected accordingly.

Figure 6:
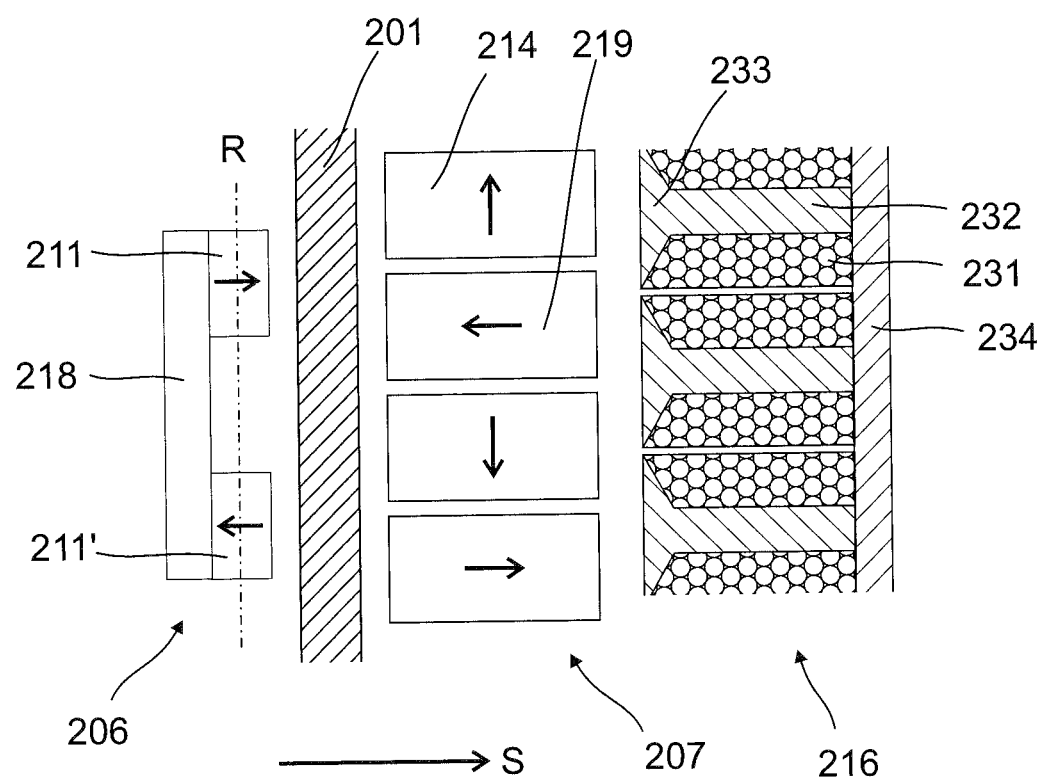
FIG. 6 shows a schematic representation of the magnet arrangements and the magnetization thereof in a second further development.

Another further development is schematically depicted in FIG. 6. The further development relates to the magnet adjustment means 216, with which the second magnet arrangement 207 is moved about the housing 201. In said further development, the second magnet arrangement 207 is moved with the aid of a coil arrangement. The coil arrangement surrounds the housing 201 and a movement path of the second magnet arrangement 207 at least in sections in the circumferential direction. The coil arrangement includes an electrical coil 231, the magnetic field of which is aligned with the radial direction S, for example parallel to it. The electrical coil 231 preferably has a coil core 232 and a pole 233 facing the second magnet arrangement 207 for field focusing. A yoke 234 is located on a side of the coil core 232 opposite the pole 233. The yoke 234 guides the magnetic field and closes a magnetic circuit that is formed between the electrical coil 231 and the magnets 214 and guide magnets 219 of the second magnet arrangement 207. By arranging multiple electrical coils 231 along the movement path of the second magnet arrangement 207 and changing the energization, the second magnet arrangement 207 couples to changing coils 231 and is consequently carried along and mechanically moved.

The second magnet arrangement 207 can, as in the example according to FIG. 5, comprise magnets 214 and guide magnets 219. The first magnet arrangement can be embodied according to one of the exemplary embodiments shown according to FIG. 1 to FIG. 5 and can comprise permanent magnets 211 and 211' that have opposite polarity as well as field conductors 218.

The following is a list of reference signs used in this specification and in the drawings.

1; 101; 201 Housing
2 Interior space
3 First connector
4 Second connector
5 Tappet
6; 106; 206 First magnet arrangement
7; 107; 207 Second magnet arrangement
8 Outer side
9 Spiral
10 Hollow space
11 Spherical magnet
12 Inside
13 Guide
14; 114; 214 Magnet
15 Magnet holder
16; 216 Magnet adjustment means
17 Steel sphere
111; 111'; 211; 211' Permanent magnet
118; 218 Field conductor
119; 219 Guide magnets
231 Electrical coil
232 Coil core
233 Pole
234 Yoke
A Longitudinal axis
H Stroke
L Length
W Angle
R Axis of the tube
S Radial direction

The invention claimed is:

1. A process component having a longitudinal axis, the process component comprising:
a housing that surrounds an interior space and comprises a first connector and a second connector;
a tappet located in the interior space;
a first magnet arrangement located on the tappet; and
a second magnet arrangement that is magnetically coupled to the first magnet arrangement and is rotatable on the housing about the longitudinal axis, wherein the tappet cooperates with a guide provided in the interior space, displacing the first magnet arrangement towards the second magnet arrangement to convert a rotary movement of the second magnet arrangement into an axial movement of the tappet, wherein the guide includes two domes in a form of spherical sectors.

2. The process component according to claim 1, wherein a fluid connection is between the first connector and the second connector, and the tappet is designed in a suitable manner to interrupt the fluid connection.

3. The process component according to claim 1, wherein the first magnet arrangement includes a spiral having at least one permanent magnet.

4. The process component according to claim 3, wherein the second magnet arrangement extends in a direction of the longitudinal axis over a height of a spiral winding of the spiral.

5. The process component according to claim 3, wherein, in each position of the tappet, more than a length of a pitch of the spiral is in operative contact with an inside of the housing.

6. A process component having a longitudinal axis, the process component comprising:
a housing that surrounds an interior space and comprises a first connector and a second connector;
a tappet located in the interior space;
a first magnet arrangement located on the tappet; and
a second magnet arrangement that is magnetically coupled to the first magnet arrangement and is rotatable on the housing about the longitudinal axis, wherein the tappet cooperates with a guide provided in the interior space, displacing the first magnet arrangement towards the second magnet arrangement to convert a rotary movement of the second magnet arrangement into an axial movement of the tappet, wherein the first magnet arrangement includes at least two spherical magnets, between which a non-magnetic steel sphere is located, and a magnetization of which is aligned with a radial direction.

7. The process component according to claim 1, wherein the first magnet arrangement includes at least two permanent magnets, a magnetization of which is aligned in opposite directions to one another and with a radial direction, and which are connected to one another with a field conductor.

8. The process component according to claim 1, wherein the second magnet arrangement includes at least two magnets that are aligned magnetically in opposite directions to one another so that a magnetic north pole and a magnetic south pole are approximately opposite one another.

9. The process component according to claim 1, wherein a magnet adjustment means includes an electrical coil, a magnetic field of which can be brought into operative connection with a magnetic field of the second magnet arrangement.

10. The process component according to claim 6, wherein the guide includes two domes in a form of spherical sectors.

11. The process component according to claim 4, wherein, in each position of the tappet, more than a length of a pitch of the spiral is in operative contact with an inside of the housing.

12. The process component according to claim 2, wherein the first magnet arrangement includes a spiral having at least one permanent magnet.

13. The process component according to claim 12, wherein the second magnet arrangement extends in a direction of the longitudinal axis over a height of a spiral winding of the spiral.

14. The process component according to claim 12, wherein, in each position of the tappet, more than a length of a pitch of the spiral is in operative contact with an inside of the housing.

15. The process component according to claim 13, wherein, in each position of the tappet, more than a length of a pitch of the spiral is in operative contact with an inside of the housing.

16. The process component according to claim 6, wherein a fluid connection is between the first connector and the second connector, and the tappet is designed in a suitable manner to interrupt the fluid connection.

17. The process component according to claim 6, wherein the second magnet arrangement includes at least two magnets that are aligned magnetically in opposite directions to one another so that a magnetic north pole and a magnetic south pole are approximately opposite one another.

18. The process component according to claim 6, wherein a magnet adjustment means includes an electrical coil, a magnetic field of which can be brought into operative connection with a magnetic field of the second magnet arrangement.

\* \* \* \* \*